No. 838,955. PATENTED DEC. 18, 1906.
M. DAPRON & J. FROELICH.
DISH WASHING MACHINE.
APPLICATION FILED FEB. 26, 1906.

2 SHEETS—SHEET 1.

WITNESSES.

INVENTORS
MAHALA DAPRON
JOHN FROELICH
BY
THEIR ATTORNEYS.

No. 838,955. PATENTED DEC. 18, 1906.
M. DAPRON & J. FROELICH.
DISH WASHING MACHINE.
APPLICATION FILED FEB. 26, 1906.

2 SHEETS—SHEET 2.

WITNESSES

INVENTORS
MAHALA DAPRON
JOHN FROELICH
BY
THEIR ATTORNEYS.

UNITED STATES PATENT OFFICE.

MAHALA DAPRON AND JOHN FROELICH, OF ST. PAUL, MINNESOTA.

DISH-WASHING MACHINE.

No. 838,955.        Specification of Letters Patent.        Patented Dec. 18, 1906.

Application filed February 26, 1906. Serial No. 302,938.

*To all whom it may concern:*

Be it known that we, MAHALA DAPRON and JOHN FROELICH, of St. Paul, Ramsey county, Minnesota, have invented certain new and useful Improvements in Dish-Washing Machines, of which the following is a specification.

The object of our invention is to provide a machine in which a quantity of dishes may be placed and easily and quickly washed and dried without handling.

A further object is to provide a machine that will require but little water, which may be cold when put into the machine and heated after being deposited therein in a very short space of time and with a small amount of fuel.

A further object is to provide a machine which can be easily operated and one of simple construction and large capacity.

The invention consists generally in various constructions and combinations, all as hereinafter described, and particularly pointed out in the claims.

Figure 1:
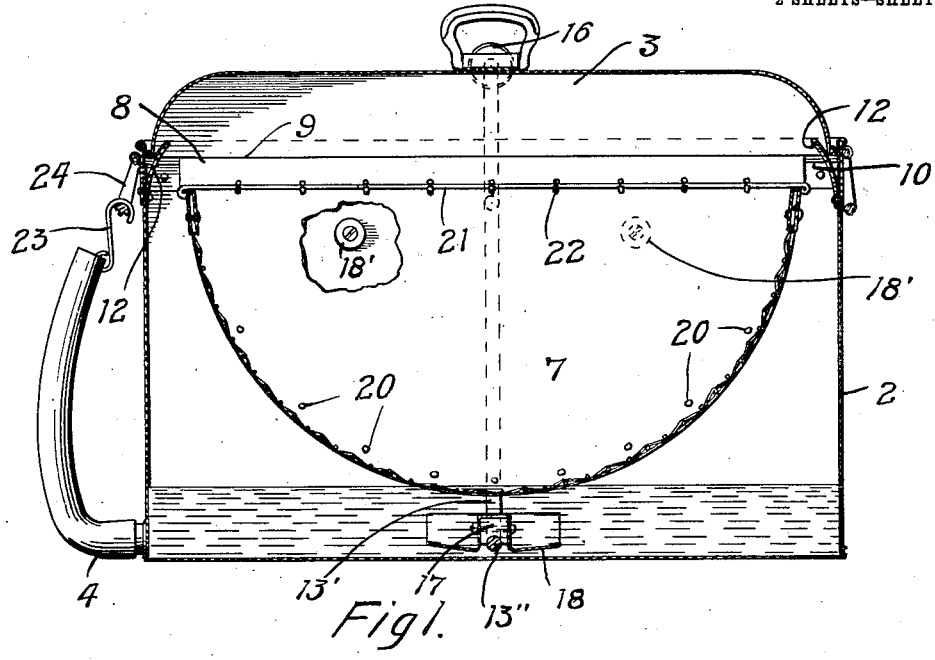
Figure 2:
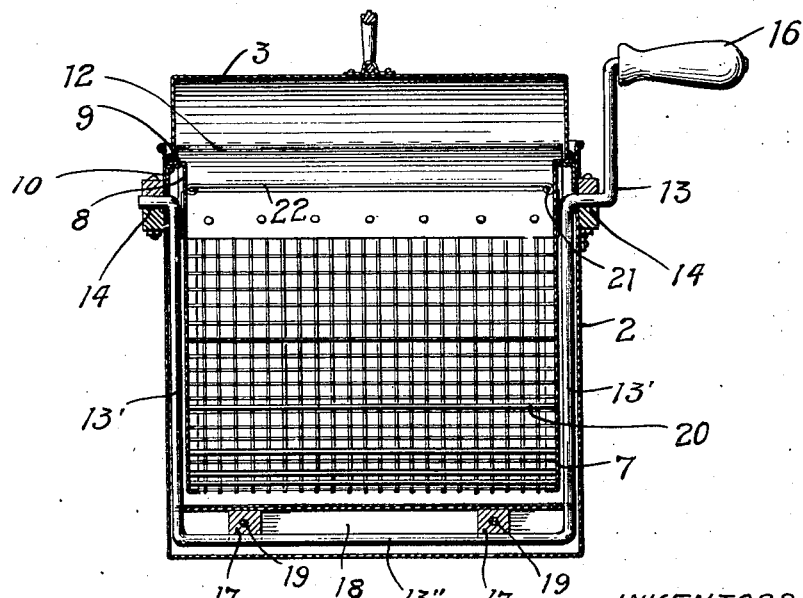
Figure 3:
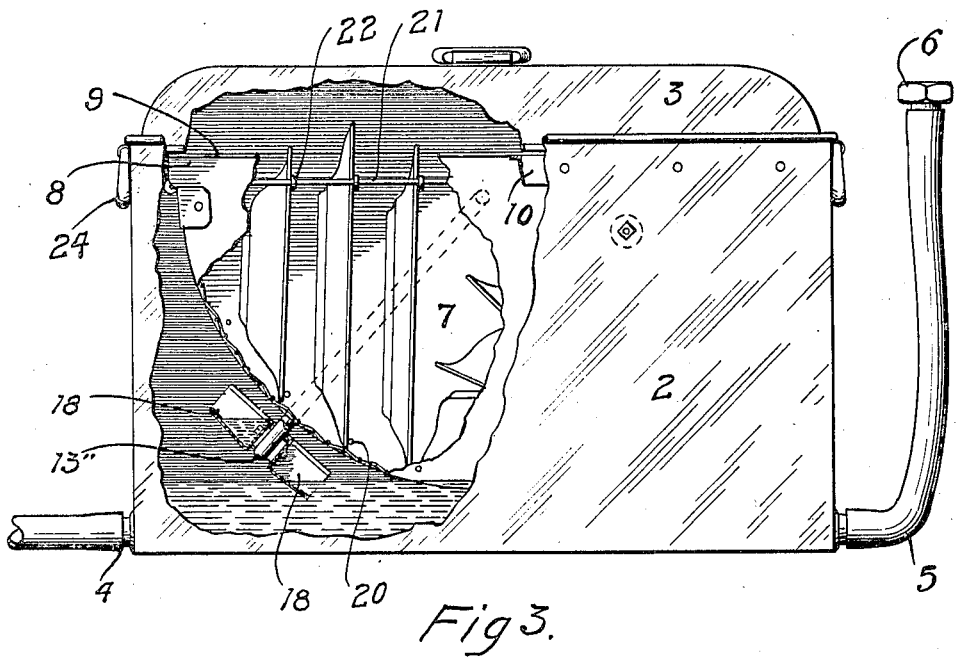
Figures 4, 5:
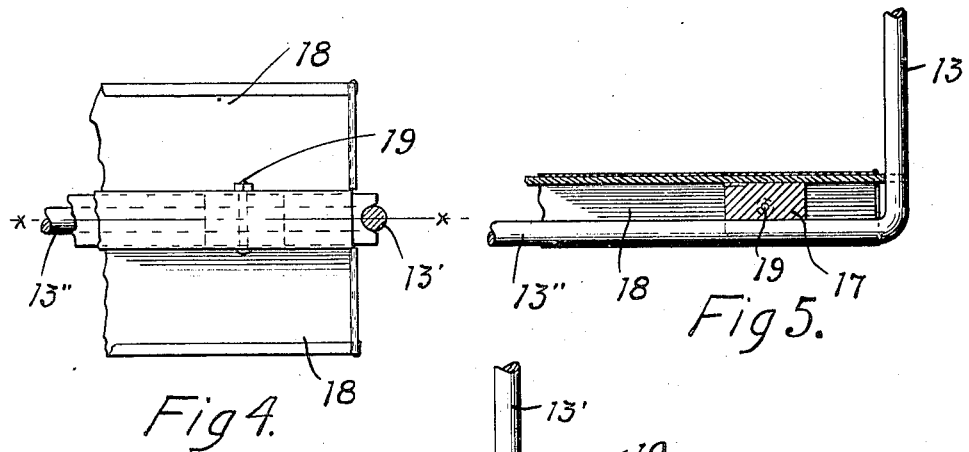
Figure 6:
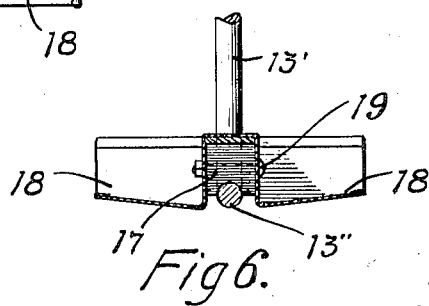

In the accompanying drawings, forming part of this specification, Figure 1 is a longitudinal vertical sectional view of a washing-machine embodying our invention. Fig. 2 is a transverse vertical sectional view of the same. Fig. 3 is a side elevation of the machine, a portion of one wall being broken away, showing the manner of arranging and supporting the dishes therein. Figs. 4, 5, and 6 are detail views of the paddle or agitating device by means of which the water is thrown upon and between the dishes.

In the drawings, 2 represents a water tank or receptacle of suitable size made, preferably, of galvanized sheet-steel, having an open top provided with an arched cover 3. The tank has a waste-pipe 4 at one end and is placed on the range or gas-stove to heat the water. Where there is a hot-water faucet, as in flats or houses heated from a central plant, an intake-pipe 5 may be provided at one end of the tank, having a coupling 6 for attachment to the faucet to allow hot or cold water to be directed through the tank and a fresh supply maintained therein during the dish-washing operation. When the dishes are first placed in the machine, the coupling 6 may be connected to the hot-water faucet, and after the dishes have been thoroughly washed they may be rinsed with hot water, or the coupling may be transferred to the cold-water faucet and the dishes rinsed with cold water. Particles of grease and crumbs washed off the dishes and collecting in the bottom of the tank will be washed out through the waste-pipe by the flow of fresh water therein. The apparatus may thus be thoroughly flushed or washed out without the necessity of taking it apart after each washing operation.

Within the water-tank forming the body of the machine we provide a basket or dish-receptacle 7, having a wire mesh or perforated semicircular bottom and provided with a band 8, extending around its upper edge with an outwardly-turned flange 9, which rests upon angle-plates 10, secured to the inner wall of the tank and supporting the basket therein. Deflector-plates 12 are secured to the end walls of the tank and curved inwardly toward the ends of the basket, which are spaced a suitable distance from the said end walls to allow passage of the water-scoop between them. The side walls of the basket are also spaced from the sides of the tank. A crank 13 is supported in bearings 14 on each side of the tank and has depending arms 13' and a cross-bar 13" connecting them, forming a swing extending down under the basket and between the sides of the same and the walls of the tank. The bearings of the crank are at the center of the circle coinciding with the curve of the bottom of the basket. A suitable handle 16 is provided on the said crank to facilitate the oscillation of the same back and forth in the tank.

Upon the cross-bar 13', or the part extending across the bottom of the tank, we provide a block 17 and secure flanged blades or plates 18 thereon by means of bolts 19 to form a double-edged scoop, said blades being adapted to sweep through the water in the bottom of the tank and scoop up a quantity of it and throw it upward toward the center and through the meshes of the basket against the dishes with sufficient force to thoroughly wash and cleanse them. We also provide stops 18', preferably of rubber, on the walls of the tank, which the scoop engages at each end of its stroke, with the result that the water remaining in the scoop is discharged against the curved plates 12 and directed thereby over the dishes in the basket. The oscillation of the crank in the tank will cause a considerable amount of water to be gathered up by the blades 18 of the scoop and driven through the bottom and sides of the basket, and the quick stopping of the crank when it reaches the end of its stroke will throw the water with considerable force up against the arched walls of the cover and down among the dishes in the basket beneath. In this way water will be forced up through the bottom and sides of the basket and from the top downward, and the dishes will not only drain readily but every part of their surfaces will be exposed to the action of the water.

For the purpose of supporting plates or platters having flat surfaces of considerable area on edge in the basket we provide a series of wires 20, extending transversely thereof near the bottom, and rods 21, adapted to rest on the top of the basket and connected by cross-wires or stays 22, sufficient space being provided between the cross-wires to allow plates or dishes to be inserted on edge into the basket and supported in an upright position therein, as shown in Fig. 3. A space is thereby formed between the plates to permit water to contact with their flat surfaces and thoroughly clean the same. The smaller dishes—such as cups, saucers, and glasses—may be piled in the bottom of the basket, and the water pouring thereon from above and below will effectually wash the same.

In using the machine a sufficient amount of water will be placed in the tank to immerse the scoops, and where the tank is not connected with a faucet we prefer to provide a hook 23 on the waste-pipe for fastening it in an upright position to the tank-handles 24, or to any other suitable support, for the purpose of preventing the discharge of the water from the tank until the washing operation has been completed. Where the water is heated over a stove or gas-jet, the rinsing may be accomplished by pouring boiling water over the dishes or heating a second supply of water, the dishes drying in a few moments after the operation.

The apparatus is capable of various modifications and changes in details of construction without departing from the spirit of our invention.

We claim as our invention—

1. The combination with a tank adapted to contain a supply of water, of a basket suspended therein adapted to contain dishes, a space being provided between the walls of said tank and basket, a double-edged water-scoop arranged between said basket and the bottom of said tank and having a oscillating movement from the top of said basket at one end of the tank to the top of the basket at the opposite end, and inwardly-curved plates provided near the top of said basket against which the water brought up by said agitator is thrown, for the purpose specified.

2. The combination with a tank adapted to contain a supply of water, of a basket supported therein and spaced from the walls and bottom of said tank, a scoop arranged transversely of said tank and comprising depending arms and a cross-bar extending under said basket, and a block secured on said bar and having angle-blades extending horizontally therefrom, and said arms having an oscillating movement between said basket and tank, substantially as described.

3. The combination with a tank having a cover and adapted to contain a supply of water, of a basket suspended within said tank and having a perforated semicircular bottom and spaced from the walls and bottom of said tank, a water-scoop suspended below said basket and having an oscillating movement between the same and the end walls and bottom of said tank and adapted to lift the water and discharge it through and over said basket, and stops provided on said tank in the path of said scoop whereby as said scoop passes through the lower part of the tank a portion of the water will be thrown through the bottom of the basket and when said scoop is checked by the stops, a portion of the water will be thrown over the top of the basket, substantially as described.

4. The combination, with a tank having a cover and adapted to contain a supply of water, of a basket suspended within said tank and having a perforated semicircular bottom and spaced from the walls and bottom of said tank, a water-scoop suspended below said basket and having an oscillating movement between the basket and the walls and bottom of said tank, and means for checking the upward movement of said scoop below the top of said basket whereby as said scoop passes through the lower part of the tank a portion of the water will be thrown through the bottom of the basket and when said scoop is checked, a portion of the water will be thrown over the top of the basket, substantially as described.

5. The combination, with a tank, having a cover and adapted to contain a supply of water, of a basket having a perforated bottom and adapted to contain dishes and suspended within said tank, a space being provided between the bottom of said tank and the bottom and walls of said tank, a crank journaled in the side walls of said tank and having arms depending between said side walls and said basket, a cross-bar connecting said arms between the bottom of said basket and tank, a block mounted on said bar, angle-blades provided each side of said bar and extending horizontally therefrom and forming with said bar a double scoop to gather up the water as said bar is oscillated and discharge it through the bottom of said basket and over the same, substantially as described.

In witness whereof we have hereunto set our hands this 21st day of February, 1906.

MAHALA DAPRON.
JOHN FROELICH.

Witnesses:
RICHARD PAUL,
C. G. HANSON.